(12) United States Patent
Stipe (10) Patent No.: US 12,040,001 B1
(45) Date of Patent: Jul. 16, 2024

(54) PHASE-COHERENT IN-LINE VCSEL ARRAY WITH SLIDER TRAILING MOUNT FOR HAMR

(71) Applicant: Western Digital Technologies, Inc., San Jose, CA (US)

(72) Inventor: Barry C. Stipe, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 18/230,018

(22) Filed: Aug. 3, 2023

Related U.S. Application Data (60) Provisional application No. 63/523,839, filed on Jun. 28, 2023.

(51) Int. Cl.
| | | |
|---|---|---|
| *G11B 5/48* | (2006.01) | |
| *G11B 13/08* | (2006.01) | |
| *G11B 5/00* | (2006.01) | |

(52) U.S. Cl.
CPC ............ *G11B 5/4866* (2013.01); *G11B 13/08* (2013.01); *G11B 2005/0021* (2013.01); *G11B 2209/02* (2013.01)

(58) Field of Classification Search
CPC .................. G11B 5/4866; G11B 13/08; G11B 2005/0021; G11B 2209/02
See application file for complete search history.

(56) References Cited

U.S. PATENT DOCUMENTS

| | | | |
|---|---|---|---|
| 7,627,018 B1* | 12/2009 | Guilfoyle | G02B 6/4214 |
| | | | 372/102 |
| 8,116,171 B1 | 2/2012 | Lee | |
| 8,139,448 B1 | 3/2012 | Hirano et al. | |
| 9,196,278 B1* | 11/2015 | Tatah | G11B 5/4866 |
| 2012/0113770 A1 | 5/2012 | Stipe | |
| 2014/0098652 A1 | 4/2014 | Tomiyama et al. | |
| 2018/0335575 A1* | 11/2018 | Gudeman | G02B 6/3608 |
| 2021/0201942 A1* | 7/2021 | Zhao | G11B 5/4866 |
| 2021/0398557 A1* | 12/2021 | Stipe | G11B 5/6088 |
| 2022/0189507 A1 | 6/2022 | Stipe et al. | |
| 2022/0407292 A1* | 12/2022 | Matsumoto | H01S 5/0225 |

OTHER PUBLICATIONS

International Search Report and Written Opinion for Application No. PCT/US2024/012257 dated May 17, 2024.

* cited by examiner

*Primary Examiner* — Andrew Sasinowski
(74) *Attorney, Agent, or Firm* — PATTERSON + SHERIDAN, LLP (57) ABSTRACT

The present disclosure relates to pretreating a magnetic recording head assembly for magnetic media drive. The magnetic recording head assembly comprises a slider having a media facing surface (MFS), a top surface disposed opposite the MFS, a trailing edge surface disposed adjacent to the top surface, and an optical grating disposed on the trailing edge surface. A vertical cavity surface emitting laser (VCSEL) device is mounted to the trailing edge surface of the slider. The VCSEL device is aligned with the optical grating. A magnetic recording head comprising a waveguide and a near field transducer (NFT) coupled to the waveguide is disposed on the trailing edge surface of the slider. The VCSEL device is capable of emitting a plurality of lasers that are phase coherent on to the optical grating. The optical grating is capable of directing the emitted lasers about 90 degrees to the waveguide.

22 Claims, 5 Drawing Sheets

PHASE-COHERENT IN-LINE VCSEL ARRAY WITH SLIDER TRAILING MOUNT FOR HAMR

CROSS-REFERENCE TO RELATED APPLICATIONS

This application claims benefit of U.S. provisional patent application Ser. No. 63/523,839, filed Jun. 28, 2023, which is herein incorporated by reference.

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 $Tbit/in^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium. The laser source is often disposed on top of a slider, which adds extra height to the magnetic recording assembly. The added height thus increases disk-to-disk spacing within the magnetic recording assembly, limiting the amount of disks and negatively impacting the capacity of the drive.

Therefore, there is a need in the art for an improved HAMR magnetic media drive.

SUMMARY OF THE DISCLOSURE

The present disclosure relates to pretreating a magnetic recording head assembly for magnetic media drive. The magnetic recording head assembly comprises a slider having a media facing surface (MFS), a top surface disposed opposite the MFS, a trailing edge surface disposed adjacent to the top surface, and an optical grating disposed on the trailing edge surface. A vertical cavity surface emitting laser (VCSEL) device is mounted to the trailing edge surface of the slider. The VCSEL device is aligned with the optical grating. A magnetic recording head is disposed on the trailing edge surface of the slider, the magnetic recording head comprising a waveguide and a near field transducer (NFT) coupled to the waveguide. The VCSEL device is capable of emitting a plurality of lasers that are phase coherent on to the optical grating. The optical grating is capable of directing the emitted lasers about 90 degrees to the waveguide.

In one embodiment, a magnetic recording head assembly comprises a slider, comprising: a media facing surface, a top surface opposite the media facing surface, a trailing edge surface adjacent to the top surface, a leading edge surface opposite the trailing edge surface, and an optical grating disposed on the trailing edge surface, a vertical cavity surface emitting laser (VCSEL) device coupled to the trailing edge surface of the slider, the VCSEL device disposed over the optical grating, and a magnetic recording head disposed on the trailing edge surface of the slider.

In another embodiment, a magnetic recording head assembly comprises a slider, comprising: a media facing surface, a top surface opposite the media facing surface, a trailing edge surface adjacent to the top surface, a leading edge surface opposite the trailing edge surface, an optical grating disposed on the trailing edge surface, and a heat sink stud disposed adjacent to the optical grating, a vertical cavity surface emitting laser (VCSEL) device coupled to the trailing edge surface of the slider, wherein the VCSEL device is capable of emitting a plurality of lasers that are phase coherent, and a magnetic recording head disposed on the trailing edge surface of the slider, the magnetic recording head comprising a waveguide and a near field transducer (NFT) coupled to the waveguide.

In yet another embodiment, a magnetic recording head assembly comprises a slider, comprising: a media facing surface, a top surface opposite the media facing surface, a trailing edge surface adjacent to the top surface, a leading edge surface opposite the trailing edge surface, an optical grating disposed on the trailing edge surface, and a heat sink stud disposed adjacent to the optical grating, a vertical cavity surface emitting laser (VCSEL) device coupled to the trailing edge surface of the slider, the VCSEL device comprising: a first contact pad disposed on a front surface of the VCSEL device, the front surface facing the trailing edge surface of the slider, and a VCSEL array disposed adjacent to the first contact pad, the VCSEL array comprising a plurality of laser apertures, wherein the VCSEL device is capable of emitting a plurality of lasers that are phase coherent through the plurality of laser apertures, and a magnetic recording head disposed on the trailing edge surface of the slider, the magnetic recording head comprising a waveguide and a near field transducer (NFT) coupled to the waveguide.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to pretreating a magnetic recording head assembly for magnetic media drive. The magnetic recording head assembly comprises a slider having a media facing surface (MFS), a top surface disposed opposite the MFS, a trailing edge surface disposed adjacent to the top surface, and an optical grating disposed on the trailing edge surface. A vertical cavity surface emitting laser (VCSEL) device is mounted to the trailing edge surface of the slider. The VCSEL device is aligned with the optical grating. A magnetic recording head is disposed on the trailing edge surface of the slider, the magnetic recording head comprising a waveguide and a near field transducer (NFT) coupled to the waveguide. The VCSEL device is capable of emitting a plurality of lasers that are phase coherent on to the optical grating. The optical grating is capable of directing the emitted lasers about 90 degrees to the waveguide.

Figure 1:
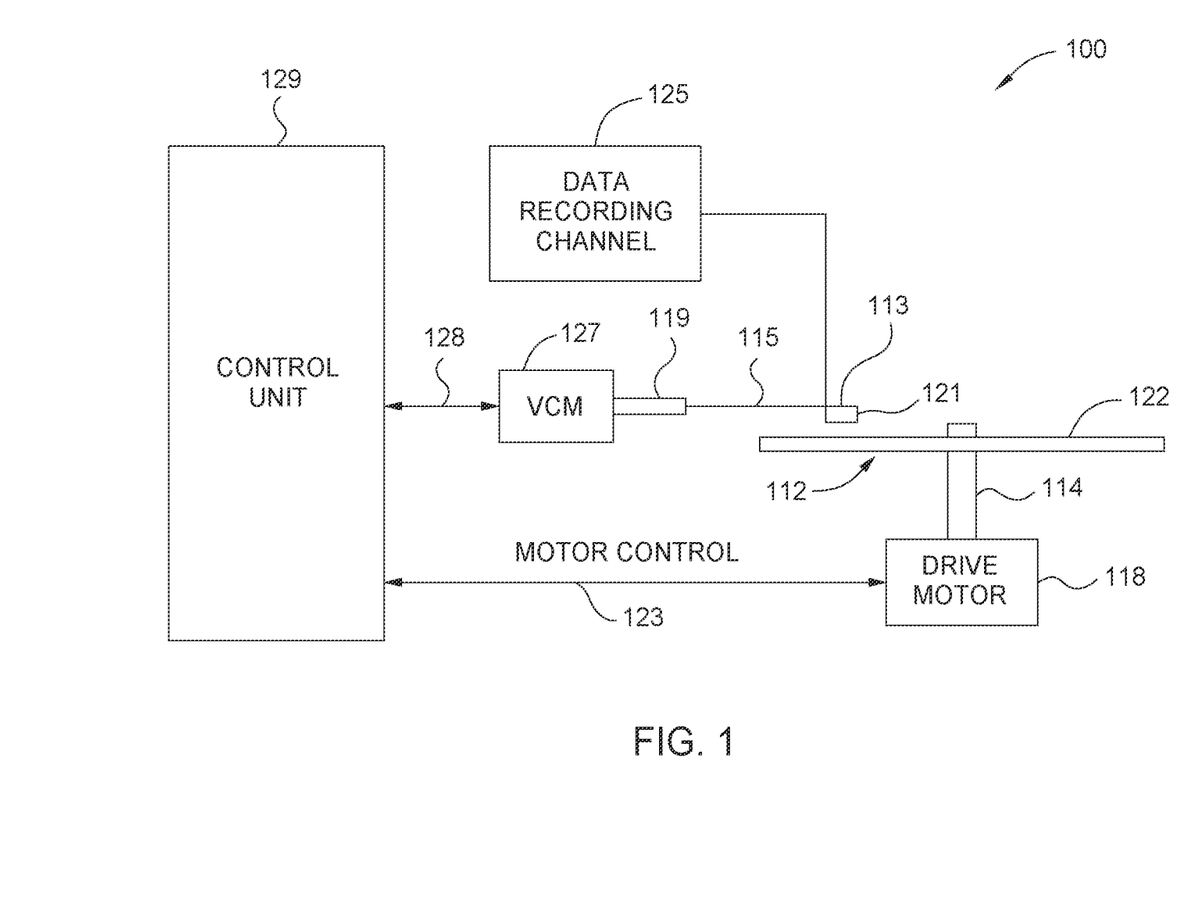
FIG. 1 is a schematic illustration of certain embodiments of a magnetic media drive including a HAMR magnetic write head.

FIG. 1 is a schematic illustration of certain embodiments of a magnetic media drive 100 including an energy-assisted magnetic recording (EAMR) write head, such as a heat-assisted magnetic recording (HAMR) or microwave assisted magnetic recording (MAMR) write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
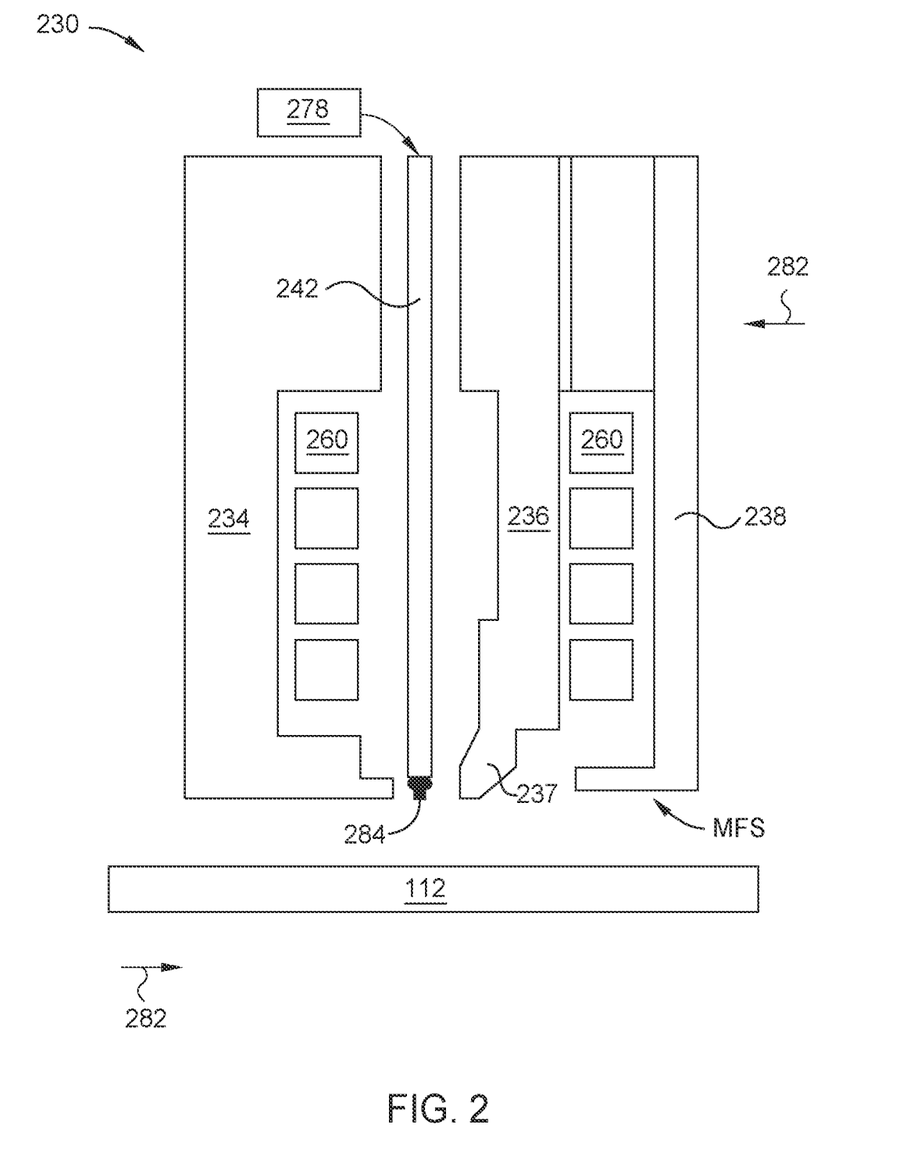
FIG. 2 is a schematic illustration of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242.

Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 absorbs heat from the waveguide light which can have a negative effect on reliability of the HAMR write head 230. Surrounding metal is used as a heatsink to minimize the temperature.

Optical power from an external coherent light source (i.e., EELD, surface emitting diode laser, VCSEL device, or fiber coupled diode laser) is coupled into the PLC of the HAMR head slider through the SSC or mode converter. The basic design concept is to match the mode profile of the incoming light source and the mode profile of the PLC, both at the coupling interface, hence maximizing the overall coupling efficiency.

Figure 3A:
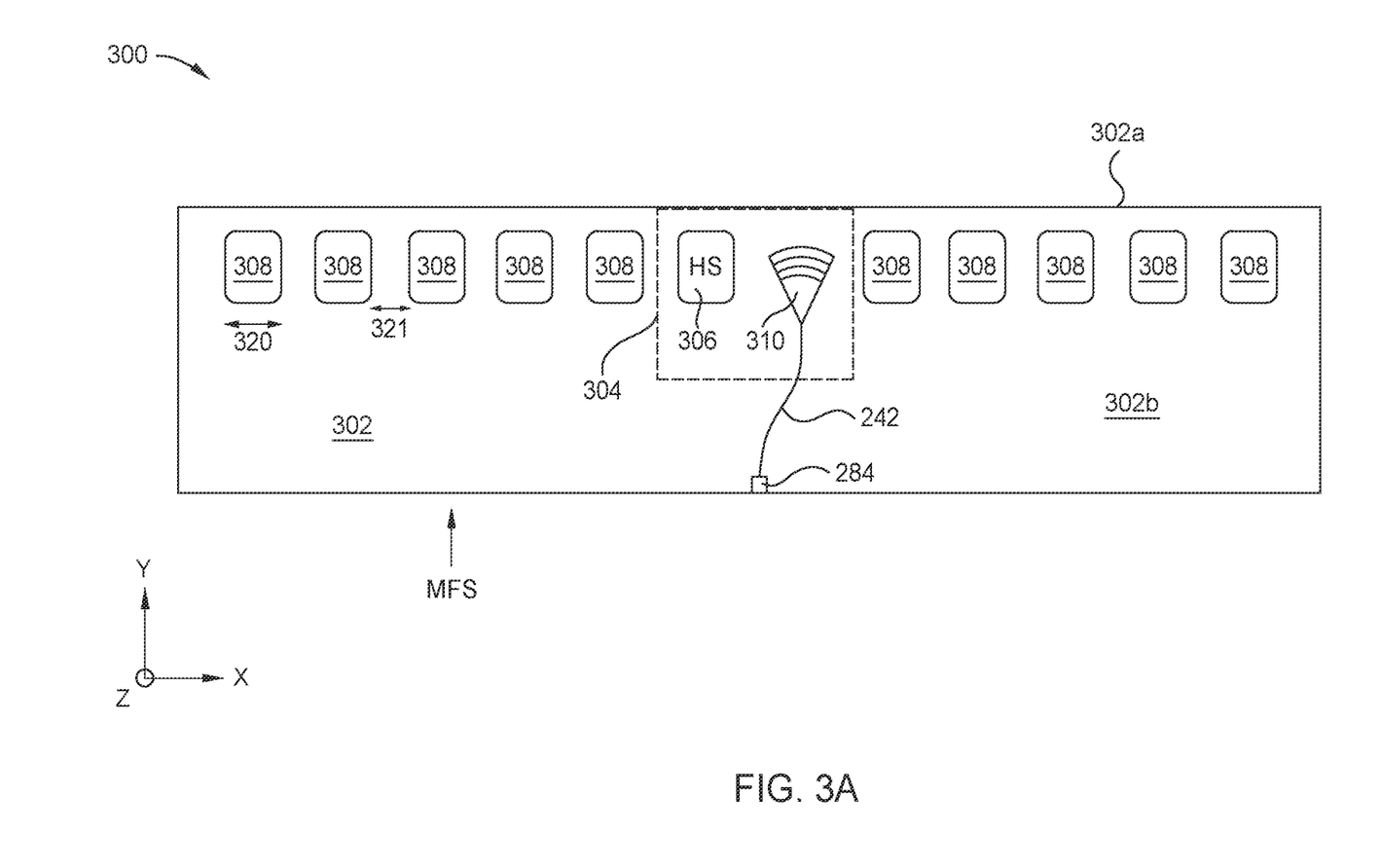
FIGS. 3A-3B illustrate a magnetic recording head assembly, according to one embodiment.
Figure 3B:
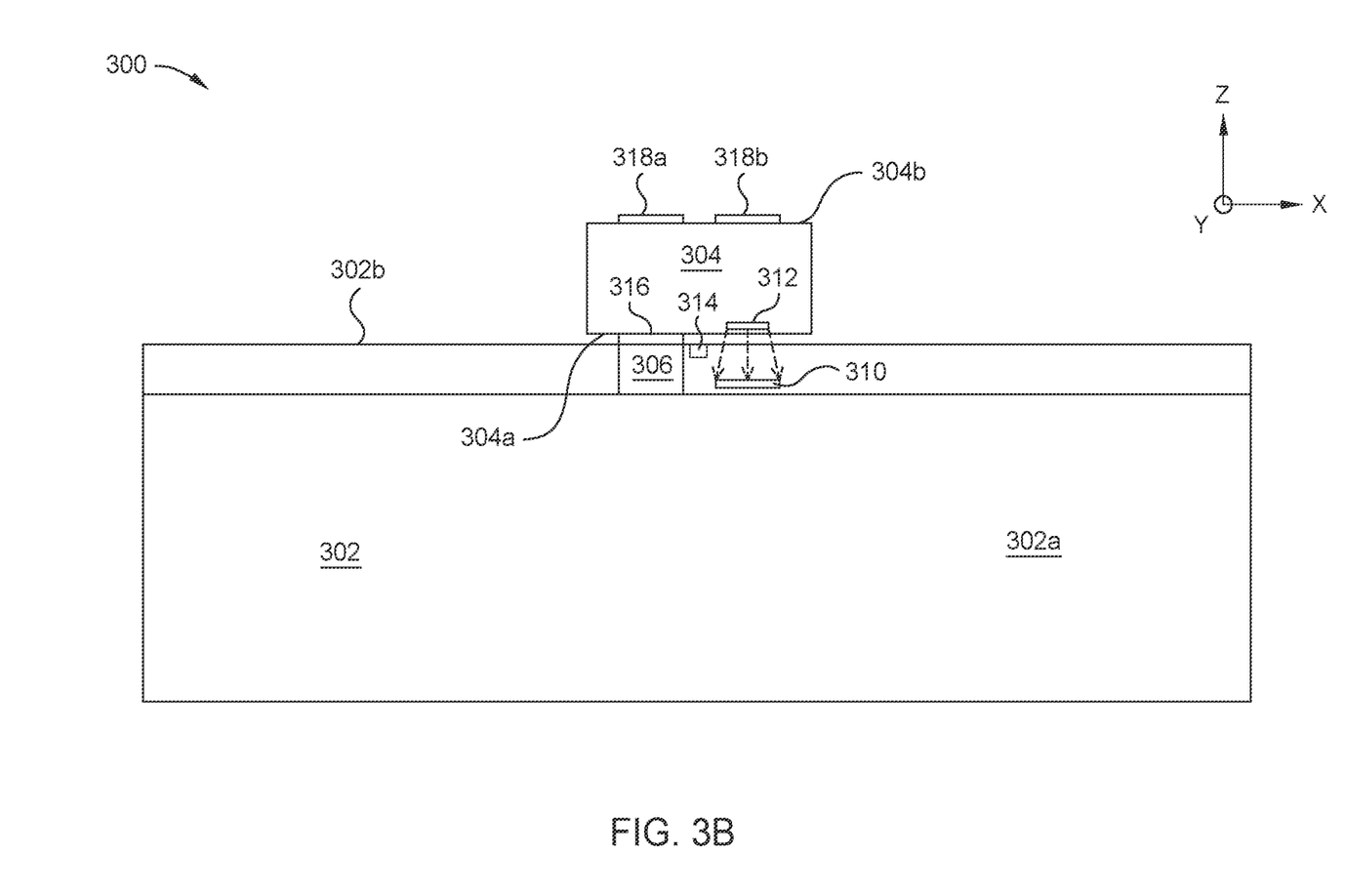
Figure 3C:
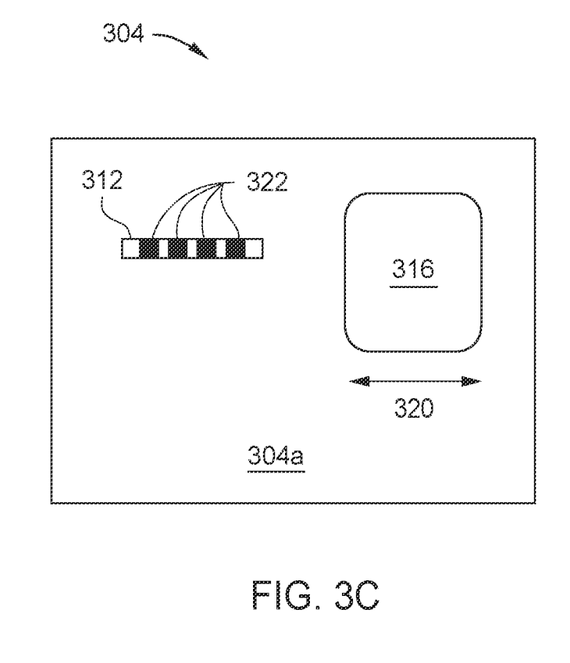
FIGS. 3C-3D illustrate a VCSEL device of the magnetic recording head assembly, according to one embodiment.
Figure 3D:
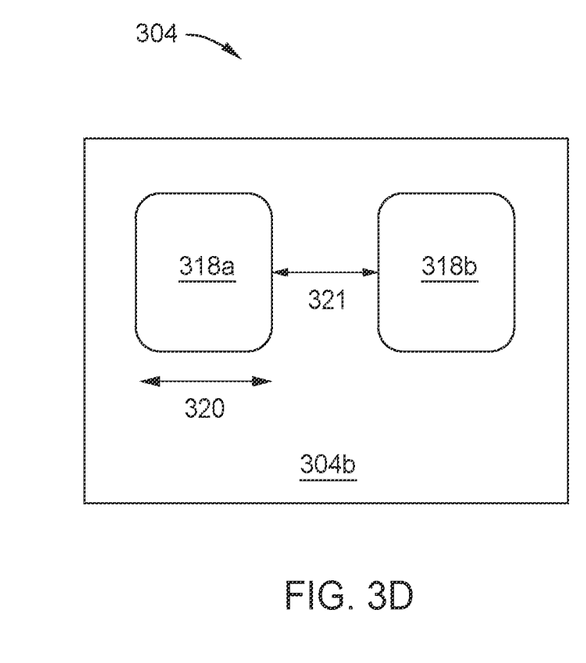

While FIG. 2 shows a general configuration of a HAMR recording head, FIGS. 3A-3B illustrate a magnetic recording head assembly 300 where the VCSEL array is mounted on the trailing edge of the slider, according to one embodiment. FIG. 3A illustrates a trailing edge surface 302b view of the magnetic recording head assembly 300, and FIG. 3B illustrates a top view of the magnetic recording head assembly 300. FIGS. 3C-3D illustrate a VCSEL device 304 of the magnetic recording head assembly 300, according to one embodiment. FIG. 3C illustrates a front or output surface 304a (or a slider facing surface) of the VCSEL device 304, and FIG. 3D illustrates a back surface 304b (or suspension tab facing surface) of the VCSEL device 304. The magnetic recording head assembly 300 may be used in combination with the HAMR write head 230 of FIG. 2, and may correspond to part of the reading/recording head assembly 121 described in FIG. 1 or a recording head used in other magnetic media drives.

As the slider 302 and a magnetic recording head 314 move over a rotating media, such as a disk, one side of the slider 302 leads, or passes over the media, while the opposite side trails, or passes over the media last. As used herein, the trailing edge surface 302b of the slider 302 refers to the side of the slider 302 that passes over the media last. The magnetic recording head 314 may incorporate elements of the HAMR head 230 of FIG. 2. However, unlike the light source 278 in FIG. 2 that is mounted on the top surface of the slider, FIGS. 3A-3D show a VCSEL device 304 mounted on this trailing edge surface 302b of the slider 302. With further reference to FIG. 3A, the slider 302 comprises a top surface 302a disposed opposite a MFS, a leading edge surface disposed adjacent to the top surface 302a, a trailing edge surface 302b disposed opposite the leading edge surface, and a media facing surface disposed opposite the top surface 302a.

The magnetic recording head assembly 300 comprises a slider 302 having a plurality of contact pads 308, such as 2 contact pads to 32 contact pads, disposed there on the trailing edge surface 302b of the slider 302 (which is adjacent to a top surface 302a) to contact or connect to a suspension (not shown; the suspension may be the suspension 115 of FIG. 1). The slider 302 comprises ceramic, for example. The contact pads 308 each has a first width 320 of about 25 μm or greater, where the spacing 321 between adjacent contact pads 308 is about 32 μm. The previously listed values are not intended to be limiting, but to provide an example of an embodiment. A heat sink contact pad or stud 306 is disposed adjacent to a contact pad 308. The heat sink contact pad 306 may have the same width 320 as the contact pads 308, and may be spaced the distance 321 from the adjacent contact pad 308. These contact pads provide electrical connection points for the disk drive circuitry to power and control the magnetic recording head on the slider. The contact pads connect to electrical paths routed through a suspension of the disk drive.

An optical grating 310 is disposed between the heat sink stud 306 and a contact pad 308. The optical grating 310 may be part of the planar lightwave circuit (PLC). In some embodiments, the optical grating 310 is disposed on core materials of the waveguide 242, such as $Ta_2O_5$ or $Nb_2O_5$. The recording head 314 is disposed on the trailing edge surface 302b of the slider 302, as shown in FIG. 3B. The dotted line box illustrates where a VCSEL device 304 will be attached to the slider 302 on the trailing edge surface 302b, like shown in FIG. 3B. The VCSEL device 304 is disposed over and aligned with the heat sink stud 306 and the grating 310, as discussed further below. The grating 310 is coupled to the waveguide 242 of the recording head 314, and the waveguide 242 is coupled to the NFT 284 of the recording head 314. The NFT 284 is disposed at a MFS, like described above in FIG. 2.

The optical grating 310 directs light output from a coherent VCSEL array 312 into the waveguide 242. The grating 310 comprises a high index dielectric material having a repeating diffraction pattern that redirects light from the VCSEL array 312 and turns or directs the light about 90 degrees into the waveguide 242 (i.e., in the -y-direction). The grating 310 may be curved and/or blazed (e.g., wedge-shaped) to couple the laser output of the VCSEL array 312 into the tapered waveguide 242. The period of the optical grating 310 is matched to half the effective wavelength of the light, as is known in the art. The waveguide 242 then directs the light from the grating 310 to the NFT 284 at the MFS.

As shown in FIG. 3B, the VCSEL device 304 is mounted to the trailing edge surface 302b of the slider 302 via a first electrode of contact pad 316. A first electrode or contact pad 316 is disposed adjacent to the coherent VCSEL array 312 on a front or recording head facing surface 304a of the VCSEL device 304, like shown in FIG. 3C. The first contact pad 316 mounts to the heat sink stud 306 in order to draw heat away from the VCSEL array 312 and into the ceramic slider 302. The first contact pad 316 may have the same width 320 as the contact pads 308. The heat sink stud 306 is disposed on the magnetic recording head 314 (shown here as a rectangle to represent the various layers of the recording head 314). The VCSEL array 312 aligns with the grating 310 in order to output light to the grating 310. The waveguide 242 and the NFT 284 are not shown in FIG. 3B, as they are located below the grating 310 in the -y-direction (e.g., into the page).

The VCSEL device 304 further comprises a second contact pad or electrode 318a and a third contact pad or electrode 318b disposed on a back surface 304b of VCSEL device 304, like shown in FIG. 3D. The back surface 304b is opposite the front surface 304a of the VCSEL device 304. The second contact pad 318a and the third contact pad 318b are each connected to the suspension, similar to the plurality of contact pads 308, and to the laser diode of the VCSEL array 312 to allow current to flow through the laser diode. The second contact pad 318a is further connected to the laser substrate and the third contact pad 318b is isolated from the laser substrate (or vice versa). Rather, the third contact pad 318b extends through the VCSEL device 304 to connect to the laser diode of the VCSEL array 312 to energize the lasers of the VCSEL array 312. The current return path is to the laser substrate and the contact pad 318a. The second and third contact pads 318a, 318b may have the same dimensions and spacing as the plurality of contact pads 308.

As shown in FIG. 3C, the VCSEL array 312 comprises a plurality of apertures 322 through which a plurality of lasers are output to the grating 310. The plurality of apertures 322 of the VCSEL array 312 are linear. The number of apertures 322 corresponds to the number of lasers of the VCSEL array 312. While four apertures 322 are shown, the VCSEL array 312 may comprise any number of apertures 322, such as 2 apertures and lasers to 32 apertures and lasers. Each aperture 322 has a size of about 1 μm to about 10 μm. Each aperture 322 is spaced from an adjacent aperture 322 a distance in the x-direction of about 2 μm to about 20 μm. The output laser power per aperture 322 is about 0.5 mW to about 10 mW. The light output from the VCSEL apertures 322 is coherent and in-phase (e.g., the output light is like a single beam).

The lasers output from the VCSEL array 312 are all in-phase, rather than being 180 degrees out-of-phase (i.e., 0 degrees out-of-phase), for example, and have no mode hopping. Furthermore, each of the plurality of lasers emitted by the VCSEL array 312 operates at the same frequency and are phase coherent. Each of the plurality of lasers have single mode outputs and a defined polarization direction. The plurality of lasers each has an active region (e.g., an area where the laser excited electrons). These active regions are spaced close enough to enable coupling and phase coherence to occur.

By mounting the VCSEL device 304 onto the trailing edge surface 302b of the slider 302, the overall height of the magnetic recording head assembly 300 is reduced, thus allowing for a reduced disk-to-disk spacing, a potentially increased number of disks, and increased HDD capacity. Furthermore, when VCSEL chips are mounted to a top surface of the slider, side electrodes are often utilized for making connection to the suspension. However, the side electrodes or contacts increase the complexity and cost of the VCSEL chip. By mounting the VCSEL device 304 to the trailing edge surface 302b, electrodes or contact pads 316, 318a, 318b are only needed on the back surface 304b and the front surface 304a of the VCSEL device 304. Thus, mounting the VCSEL device 304 to the trailing edge surface 302b of the slider 302 reduces complexity and costs during fabrication while also reducing the height of the magnetic recording head assembly 300, reducing the disk-to-disk spacing, and increasing the capacity of the magnetic recording drive.

VCSELs have a number of significant advantages for use as the light source in HAMR. The edge emitting laser diode (EELD) used is typically mounted to a sub-mount because it is difficult to bond the edge-emitting facet face of the laser directly to the top of the slider. This sub-mount is then bonded to the slider. A VCSEL can easily have bonding electrodes on the surface-emitting face which match to corresponding electrodes on the trailing edge surface of the slider, which when utilized with a grating, is able to output light from the trailing edge surface onto the grating, which then directs the light at a 90 degree angle to the waveguide. These electrodes can be bonded together by laser-assisted solder reflow and can also serve as electrical connections for energizing the laser.

By eliminating the need for a sub-mount, the light source cost can be significantly reduced. The VCSEL laser facet is made in a wafer level process which further lowers cost relative to EELDs. A VCSEL output beam is also larger and more circular than that of an EELD which increases the alignment tolerance and coupling efficiency to the slider spot size convertor. VCSELs are known to have higher reliability than EELDs due to larger, less intense optical mode and the wafer facet process. As a result, VCSELs do not require burn-in during manufacturing which further lowers cost. Since the VCSEL cavity length is shorter than EELDs, and because the laser is mounted on the trailing edge surface of the slider, the lower overall height allows for a reduced disk-to-disk spacing, potentially more disks, and for higher HDD capacity.

Further, VCSELs have mode hop-free operation due to very short cavity length with one longitudinal mode and DBR mirror selectivity while EELDs suffer from mode hops. Mode hopping can cause a small (typically 1-2%) change in laser power to suddenly occur during the recording process. The possibility of a track width change and bit shift must be accounted for, which reduces the capacity of the HDD.

The primary technical issue with VCSELs is the relatively low output power relative to EELDs. Multimode VCSELs can have larger output power than single mode VCSELs but single mode operation is required by the waveguides and NFTs that are used to create the heat spot in the disk for HAMR. Single mode VCSELs typically have only about 2 mW of maximum output power, far short of the 10 mW to 20 mW needed for HAMR. The output cannot be efficiently increased by combining the outputs from multiple separate VCSELs because of decoherence between the wave fronts. If the active region of adjacent VCSELs are brought very close together, the wave functions will overlap enough to create coupling and phase coherence between their outputs. With the right VCSEL design and light delivery scheme, these outputs may be combined into a single waveguide with the necessary 5 mW to 10 mW of single mode power needed by the NFT for HAMR.

In one embodiment, a magnetic recording head assembly comprises a slider, comprising: a media facing surface, a top surface opposite the media facing surface, a trailing edge surface adjacent to the top surface, a leading edge surface opposite the trailing edge surface, and an optical grating disposed on the trailing edge surface, a vertical cavity surface emitting laser (VCSEL) device coupled to the trailing edge surface of the slider, the VCSEL device disposed over the optical grating, and a magnetic recording head disposed on the trailing edge surface of the slider.

The VCSEL device is capable of emitting a plurality of lasers that are phase coherent. The VCSEL device is capable of emitting the plurality of lasers through a plurality of laser apertures onto the optical grating. An output laser power per laser aperture is about 0.5 mW to about 10 mW, and wherein the plurality of laser apertures is 2 apertures to 32 apertures. The magnetic recording head comprises a waveguide and a near field transducer (NFT) coupled to the waveguide, the waveguide extending from a top surface of the magnetic recording head to the NFT, the NFT being disposed at the media facing surface. The optical grating is capable of directing light output from the VCSEL device about 90 degrees to the waveguide. A magnetic media drive comprises the magnetic recording head assembly.

In another embodiment, a magnetic recording head assembly comprises a slider, comprising: a media facing surface, a top surface opposite the media facing surface, a trailing edge surface adjacent to the top surface, a leading edge surface opposite the trailing edge surface, an optical grating disposed on the trailing edge surface, and a heat sink stud disposed adjacent to the optical grating, a vertical cavity surface emitting laser (VCSEL) device coupled to the trailing edge surface of the slider, wherein the VCSEL device is capable of emitting a plurality of lasers that are phase coherent, and a magnetic recording head disposed on the trailing edge surface of the slider, the magnetic recording head comprising a waveguide and a near field transducer (NFT) coupled to the waveguide.

The optical grating is capable of directing light output from the VCSEL device about 90 degrees to the waveguide, and wherein the waveguide is capable of directing the output light to the NFT. The VCSEL device comprises a front surface facing the trailing edge surface of the slider and a back surface opposite the front surface, wherein a first contact pad and a VCSEL array are disposed on the front surface, and wherein a second contact pad and a third contact pad are disposed on the back surface. The first contact pad is connected to the heat sink stud, wherein the VCSEL array is aligned with the optical grating, and wherein the second contact pad is connected to the VCSEL array. The slider further comprises a plurality of contact pads on the trailing edge surface, and wherein the width of the contact pads are the same as the width of the second and third contact pads on the back surface of the VCSEL device. The slider further comprises a plurality of contact pads, and wherein a spacing between at least two of the slider contact pads is the substantially equal to a spacing between the second and third contact pads on the back surface of the VCSEL device. The plurality of lasers operate at the same frequency, wherein the plurality of lasers are output through a plurality of laser apertures, and wherein the plurality of laser apertures are linearly arranged. Each laser aperture has a size of about 1 µm to about 10 µm, wherein an output laser power per laser aperture is about 0.5 mW to about 10 mW, and wherein each laser aperture is spaced from an adjacent laser aperture a distance of about 2 µm to about 20 µm. A magnetic media drive comprises the magnetic recording head assembly.

In yet another embodiment, a magnetic recording head assembly comprises a slider, comprising: a media facing surface, a top surface opposite the media facing surface, a trailing edge surface adjacent to the top surface, a leading edge surface opposite the trailing edge surface, an optical grating disposed on the trailing edge surface, and a heat sink stud disposed adjacent to the optical grating, a vertical cavity surface emitting laser (VCSEL) device coupled to the trailing edge surface of the slider, the VCSEL device comprising: a first contact pad disposed on a front surface of the VCSEL device, the front surface facing the trailing edge surface of the slider, and a VCSEL array disposed adjacent to the first contact pad, the VCSEL array comprising a plurality of laser apertures, wherein the VCSEL device is capable of emitting a plurality of lasers that are phase coherent through the plurality of laser apertures, and a magnetic recording head disposed on the trailing edge surface of the slider, the magnetic recording head comprising a waveguide and a near field transducer (NFT) coupled to the waveguide.

The first contact pad is connected to the heat sink stud, wherein the VCSEL array is aligned with the optical grating. The optical grating is capable of directing light output from the VCSEL device about 90 degrees to the waveguide, and wherein the waveguide is capable of directing the output light to the NFT. The plurality of lasers operate at the same frequency, and wherein an output laser power per laser aperture is about 0.5 mW to about 10 mW. The plurality of laser apertures are linearly arranged, and wherein the plurality of laser apertures is 2 apertures to 32 apertures. A magnetic media drive comprises the magnetic recording head assembly.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head assembly, comprising:
   a slider, comprising:
   a media facing surface;
   a top surface opposite the media facing surface;
   a trailing edge surface adjacent to the top surface;
   a leading edge surface opposite the trailing edge surface; and
   an optical grating disposed on the trailing edge surface;
   a vertical cavity surface emitting laser (VCSEL) device coupled to the trailing edge surface of the slider, the VCSEL device disposed over the optical grating; and
   a magnetic recording head disposed on the trailing edge surface of the slider.

2. The magnetic recording head assembly of claim 1, wherein the VCSEL device is capable of emitting a plurality of lasers that are phase coherent.

3. The magnetic recording head assembly of claim 2, wherein the VCSEL device is capable of emitting the plurality of lasers through a plurality of laser apertures onto the optical grating.

4. The magnetic recording head assembly of claim 3, wherein an output laser power per laser aperture is about 0.5 mW to about 10 mW, and wherein the plurality of laser apertures is 2 apertures to 32 apertures.

5. The magnetic recording head assembly of claim 1, wherein the magnetic recording head comprises a waveguide and a near field transducer (NFT) coupled to the waveguide, the waveguide extending from a top surface of the magnetic recording head to the NFT, the NFT being disposed at the media facing surface.

6. The magnetic recording head assembly of claim 5, wherein the optical grating is capable of directing light output from the VCSEL device about 90 degrees to the waveguide.

7. A magnetic media drive comprising the magnetic recording head assembly of claim 1.

8. A magnetic recording head assembly, comprising:
a slider, comprising:
  a media facing surface;
  a top surface opposite the media facing surface;
  a trailing edge surface adjacent to the top surface;
  a leading edge surface opposite the trailing edge surface;
  an optical grating disposed on the trailing edge surface; and
  a heat sink stud disposed adjacent to the optical grating;
a vertical cavity surface emitting laser (VCSEL) device coupled to the trailing edge surface of the slider, wherein the VCSEL device is capable of emitting a plurality of lasers that are phase coherent; and
a magnetic recording head disposed on the trailing edge surface of the slider, the magnetic recording head comprising a waveguide and a near field transducer (NFT) coupled to the waveguide.

9. The magnetic recording head assembly of claim 8, wherein the optical grating is capable of directing light output from the VCSEL device about 90 degrees to the waveguide, and wherein the waveguide is capable of directing the output light to the NFT.

10. The magnetic recording head assembly of claim 8, wherein the VCSEL device comprises a front surface facing the trailing edge surface of the slider and a back surface opposite the front surface, wherein a first contact pad and a VCSEL array are disposed on the front surface, and wherein a second contact pad and a third contact pad are disposed on the back surface.

11. The magnetic recording head assembly of claim 10, wherein the first contact pad is connected to the heat sink stud, wherein the VCSEL array is aligned with the optical grating, and wherein the second contact pad is connected to the VCSEL array.

12. The magnetic recording head assembly of claim 10, wherein the slider further comprises a plurality of contact pads on the trailing edge surface, and wherein the width of the contact pads are the same as the width of the second and third contact pads on the back surface of the VCSEL device.

13. The magnetic recording head assembly of claim 10, wherein the slider further comprises a plurality of contact pads, and wherein a spacing between at least two of the slider contact pads is the substantially equal to a spacing between the second and third contact pads on the back surface of the VCSEL device.

14. The magnetic recording head assembly of claim 8, wherein the plurality of lasers operate at the same frequency, wherein the plurality of lasers are output through a plurality of laser apertures, and wherein the plurality of laser apertures are linearly arranged.

15. The magnetic recording head assembly of claim 14, wherein each laser aperture has a size of about 1 µm to about 10 µm, wherein an output laser power per laser aperture is about 0.5 mW to about 10 mW, and wherein each laser aperture is spaced from an adjacent laser aperture a distance of about 2 µm to about 20 µm.

16. A magnetic media drive comprising the magnetic recording head assembly of claim 8.

17. A magnetic recording head assembly, comprising:
a slider, comprising:
  a media facing surface;
  a top surface opposite the media facing surface;
  a trailing edge surface adjacent to the top surface;
  a leading edge surface opposite the trailing edge surface;
  an optical grating disposed on the trailing edge surface; and
  a heat sink stud disposed adjacent to the optical grating;
a vertical cavity surface emitting laser (VCSEL) device coupled to the trailing edge surface of the slider, the VCSEL device comprising:
  a first contact pad disposed on a front surface of the VCSEL device, the front surface facing the trailing edge surface of the slider; and
  a VCSEL array disposed adjacent to the first contact pad, the VCSEL array comprising a plurality of laser apertures, wherein the VCSEL device is capable of emitting a plurality of lasers that are phase coherent through the plurality of laser apertures; and
a magnetic recording head disposed on the trailing edge surface of the slider, the magnetic recording head comprising a waveguide and a near field transducer (NFT) coupled to the waveguide.

18. The magnetic recording head assembly of claim 17, wherein the first contact pad is connected to the heat sink stud, wherein the VCSEL array is aligned with the optical grating.

19. The magnetic recording head assembly of claim 17, wherein the optical grating is capable of directing light output from the VCSEL device about 90 degrees to the waveguide, and wherein the waveguide is capable of directing the output light to the NFT.

20. The magnetic recording head assembly of claim 17, wherein the plurality of lasers operate at the same frequency, and wherein an output laser power per laser aperture is about 0.5 mW to about 10 mW.

21. The magnetic recording head assembly of claim 17, wherein the plurality of laser apertures are linearly arranged, and wherein the plurality of laser apertures is 2 apertures to 32 apertures.

22. A magnetic media drive comprising the magnetic recording head assembly of claim 17.

* * * * *